(12) United States Patent
Swamy (10) Patent No.: US 8,488,354 B2
(45) Date of Patent: Jul. 16, 2013

(54) EIGHTEEN PULSE RECTIFICATION SCHEME FOR USE WITH VARIABLE FREQUENCY DRIVES

(75) Inventor: Mahesh Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 435 days.

(21) Appl. No.: 12/874,511

(22) Filed: Sep. 2, 2010

(65) Prior Publication Data

US 2011/0216564 A1    Sep. 8, 2011

Related U.S. Application Data

(63) Continuation-in-part of application No. 11/650,811, filed on Jan. 5, 2007, now abandoned.

(51) Int. Cl.
*H02M 7/06* (2006.01)

(52) U.S. Cl.
USPC ............................................. 363/126

(58) Field of Classification Search
USPC .................................. 363/125, 126
See application file for complete search history.

(56) References Cited

U.S. PATENT DOCUMENTS

| | | | |
|---|---|---|---|
| 3,098,963 A * | 7/1963 | Michaelis | 363/125 |
| 4,498,127 A | 2/1985 | Fiorina | |
| 4,876,634 A * | 10/1989 | Paice | 363/126 |
| 5,124,904 A | 6/1992 | Paice | |
| 5,455,759 A | 10/1995 | Paice | |
| 5,619,407 A | 4/1997 | Hammond | |
| 5,903,066 A | 5/1999 | Enjeti et al. | |
| 6,396,723 B2 | 5/2002 | Mochikawa et al. | |
| 6,525,951 B1 | 2/2003 | Paice | |
| 2002/0186112 A1 | 12/2002 | Kamath | |
| 2005/0077887 A1 | 4/2005 | Sarlioglu et al. | |

* cited by examiner

*Primary Examiner* — Jue Zhang
(74) *Attorney, Agent, or Firm* — Wood, Phillips, Katz, Clark & Mortimer (57) ABSTRACT

An AC/DC converter system comprises an input circuit for connection to a three phase AC source. An isolation transformer comprises a set of primary windings and first and second sets of secondary windings magnetically coupled to the set of primary windings. The first and second sets of secondary windings are phase shifted by select amounts from the set of primary windings. The set of primary windings is connected to the input circuit. An AC/DC converter comprises first, second and third three phase rectifiers, the first three phase rectifier being powered by the first set of secondary windings, the second three phase rectifier being powered by the second set of secondary windings, and the third three phase rectifier being powered by the input circuit. An impedance matching inductor is electrically connected between the input circuit and the third three phase rectifier. An output circuit is connected between the AC/DC converter and a DC load.

15 Claims, 8 Drawing Sheets

EIGHTEEN PULSE RECTIFICATION SCHEME FOR USE WITH VARIABLE FREQUENCY DRIVES

CROSS REFERENCE TO RELATED APPLICATIONS

This application is a continuation-in-part of application Ser. No. 11/650,811 filed Jan. 5, 2007 now abandoned.

FIELD OF THE INVENTION

The present invention relates to an AC/DC converter system and, more particularly, to an eighteen pulse rectifier using an isolation transformer with two sets of secondary windings.

BACKGROUND OF THE INVENTION

Variable Frequency Drive (VFD) systems with diode rectifier front ends draw discontinuous current from the power system to which they are connected. This results in current harmonic distortion, which eventually translates into voltage distortion. Typically, the power system is robust and can handle significant amount of current distortion without showing signs of voltage distortion. However, in cases where the majority of the load on a distribution feeder is made up of Variable Frequency Drives with rectifier front ends, the current distortion becomes an important issue. Grid-connected transformers run hotter under harmonic loading. Harmonics can have a detrimental effect on emergency generators, telephones and other electrical equipment. When reactive power compensation (in the form of passive power factor improving capacitors) is used with non-linear loads, resonance conditions can occur that may result in even higher levels of harmonic voltage and current distortion thereby causing equipment failure and disruption of power service.

There are many ways of reducing the total current harmonic distortion (THD) caused by VFDs. Multi-pulse techniques are popular because they do not interfere with the existing power system from resonance point of view and they are robust and perform well. Harmonic distortion concerns are serious when the power ratings of the VFD load increases. Large power VFDs are gaining in popularity due to their low cost and impressive reliability. Use of large power VFDs increases the amplitude of low order harmonics that can significantly impact the power system. In many large power installations, current harmonic distortion levels achievable using twelve-pulse techniques are insufficient to meet the levels recommended in IEEE Standard 519-1992. As a result eighteen-pulse VFD systems are being proposed to achieve superior harmonic performance compared to the traditional twelve-pulse systems.

A typical 3-phase full bridge rectifier is said to be a 6-pulse rectifier because there are six distinct diode pair conduction intervals in one complete electrical cycle. In such a 6-pulse rectifier with no DC bus capacitor, the characteristic harmonics are non-triplen odd harmonics (e.g., 5th, 7th, 11th, etc.). In general, the characteristic harmonics generated by a semiconductor rectifier is given by:

$$h = kq \pm 1 \quad (1)$$

where h is the order of harmonics; k is any integer, and q is the pulse number of the rectifier (six for a 6-pulse rectifier). The per unit value of the characteristic harmonics present in the theoretical current waveform at the input of the semiconductor converter is given by 1/h. In practice, the observed per unit value of the harmonics is much greater than 1/h. From these observations, it is clear that increasing the pulse number from 6 to either 12 or 18 will significantly reduce the amplitude of low order harmonics and hence the total current harmonic distortion.

The eighteen-pulse systems have become economically feasible due to the recent advances in autotransformer techniques that help reduce the overall size and cost and achieve low total current harmonic distortion. When employing autotransformers, care should be taken to force the different rectifier units to properly share the current. The eighteen-pulse configuration lends itself better in achieving this goal compared to the twelve-pulse scheme.

Figure 1:
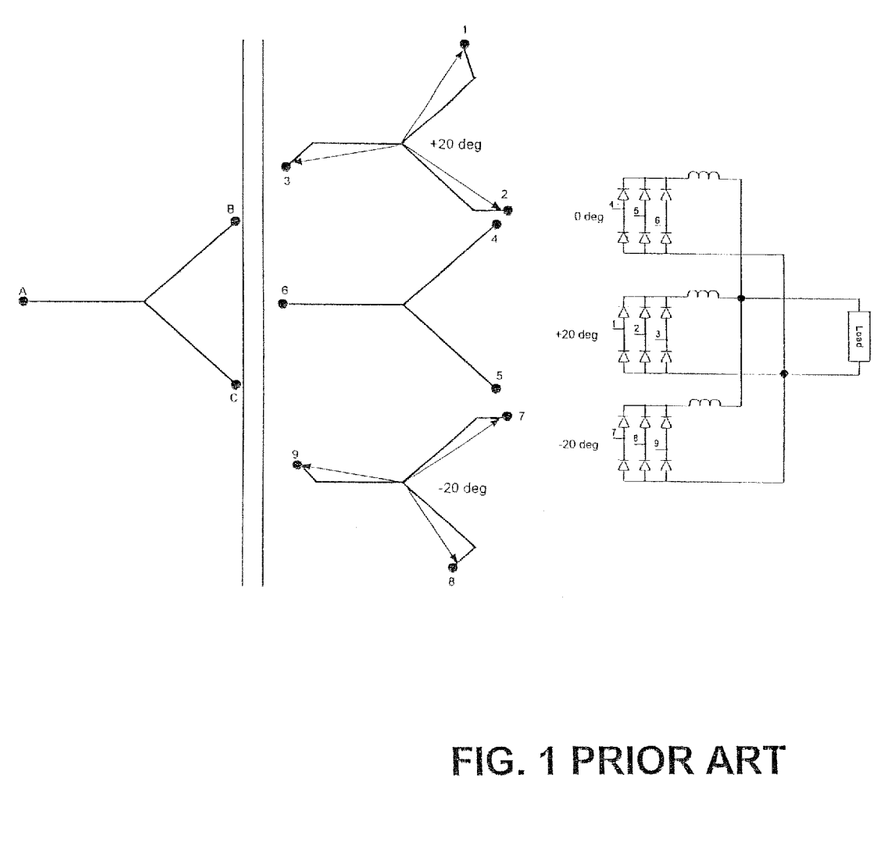
FIG. 1 is a schematic representation of a prior art eighteen-pulse converter circuit fed from a phase shifted isolation transformer.

For eighteen-pulse operation, there is a need for three sets of 3-phase AC supply that are phase shifted with respect to each other by 20 electrical degrees. Typically, this is achieved using a four winding isolation transformer that has one set of primary windings and three sets of secondary windings, as shown in FIG. 1. One set of secondary winding is in phase with the primary winding, while the other two sets are phase shifted by +20 electrical degrees and −20 electrical degrees, respectively, with the primary. This arrangement yields three phase-shifted supplies that allow eighteen-pulse operation. The use of a DC link choke is optional. The leakage inductance of the transformer may be sufficient to smooth the input current and improve the overall current harmonic distortion levels. One disadvantage of the scheme shown in FIG. 1 is that the phase-shifting isolation transformer is bulky and expensive.

Instead of using ±20 degree phase-shifted outputs from an isolation transformer for eighteen-pulse operation, a nine-phase supply can be used, where each phase lags the other by 40 electrical degrees. U.S. Pat. No. 5,455,759 shows a nine-phase AC supply using a wye-fork with a tertiary delta winding to circulate triplen harmonics. Though the size of the autotransformer is much smaller than an equivalent isolation transformer, most autotransformer schemes require the use of additional series impedance to smoothen the input AC current. The rating of the transformer is about 70% of the rating of the load. The rectified output voltage from a balanced 9-phase output is about 1.14 times higher (14% higher) than that obtained from a 3-phase 6-pulse AC to DC rectifier as noted in U.S. Pat. No. 5,124,904. This requires modifying the basic 3-phase to 9-phase converter using more windings and alternate paths to provide the needed step down action necessary to use the resulting topology on an existing 3-phase AC to DC rectifier system.

Many topological modifications including the ones in U.S. Pat. Nos. 5,124,904, 5,455,759, 5,619,407, 6,525,951 B1, etc have been employed to overcome the higher rectified voltage issue. However, the extra stub and teaser windings add cost and complexity to the structure.

U.S. Pat. No. 5,124,904 shows a nine-phase AC supply using a delta-fork that does not require any additional delta winding. In this configuration, the average DC output voltage is about 14% higher than that obtained using a standard six-pulse rectifier scheme. This can potentially stress the DC bus capacitors and the IGBTs in the inverter section of a VFD. In order to overcome this, additional teaser windings are used. These windings not only add cost and increase the overall rating of the transformer, but also cause imbalance that results in higher than normal circulating currents in the delta windings, which need to be accommodated. The harmonic performance is good but the overall size is large with rated current flow through the teaser windings.

In order to overcome the 14% higher average DC bus voltage observed in the previous configuration, a modification of the configuration was proposed in the U.S. Pat. No.

5,619,407. The harmonic performance is similar and the average DC bus voltage is equal to that observed in six-pulse rectifiers. Similar to the previous configuration, the stub winding currents are high and the teaser winding needs to carry rated load current making the overall transformer big in size and expensive to wind.

In autotransformer configurations using stub and/or teaser windings, discussed above, the overall size and rating of the autotransformer is higher than the optimal value. Use of stub windings typically results in poor utilization of the core and involves more labor to wind the coils. A polygon type of autotransformer is better than stub type autotransformer from size and core utilization points of view. A polygon type autotransformer is shown in U.S. Pat. No. 4,876,634. This configuration requires the use of inter-phase transformers and input AC inductors to achieve low total current harmonic distortion. The reason is that the outputs are not equally spaced to achieve a nine-phase AC supply as in the previous configurations. The polygon autotransformer provides +/−20° phase shifted outputs to achieve eighteen-pulse operation.

A popular eighteen-pulse autotransformer configuration is shown in U.S. Pat. No. 6,525,951. This configuration is a modified version of the configuration shown in the '759 patent. A delta-connected tertiary winding is included in the wye fork. This construction is called a windmill construction. Initially, the windmill structure was present in each phase and the size of the transformer was still big. The kVA rating was about 60%. By removing the windmill structure from two of the three phases, it was shown that the performance remained equally good. By adopting the modified structure of the 759 patent, the kVA rating of the autotransformer was reduced from 60% to 55%.

In the eighteen-pulse autotransformer systems, the change of current from one conducting diode pair to the other is quite sudden and occurs every 40 electrical degrees. The situation is amplified since most autotransformers do not have enough leakage inductance to slow the transition, resulting in high di/dt across the rectifier diodes. Though the RMS current rating may not exceed the current rating of the diode, attention should be given to the dk/dt of the current through the diodes. The present inventors have studied this phenomenon is detail and have statistical records that show that standard rectifier grade diodes are vulnerable to premature failure.

Some important drawbacks of the topologies discussed in the prior art are as follows:
  a. Autotransformer based topologies require significant input impedance to smooth the current and reduce the overall input current distortion,
  b. Autotransformer techniques utilize complex winding structures, either of the stub-type or the polygon type. These transformers are labor intensive to manufacture and result in poor core utilization,
  c. Because of complicated winding structure and the fact that partial turns are not practically feasible to build, the error resulting in rounding off can be significant that influences the final performance. This is one reason why input impedance of significant value is needed to account for such aberrations, and
  d. The change of current from one conducting diode pair to the other is quite sudden in all autotransformer configurations. This causes higher than normal di/dt stress in rectifier diodes and should be considered while designing systems required to have high reliability.

The present invention is directed to solving one or more of the problems discussed above in a novel and simple manner.

SUMMARY OF THE INVENTION

The present invention is directed to an AC/DC converter system and, more particularly, to an eighteen pulse rectifier using an isolation transformer with two sets of secondary windings.

In accordance with one aspect of the invention there is described an AC/DC converter system comprising an input circuit for connection to a three phase AC source. An isolation transformer comprises a set of primary windings and first and second sets of secondary windings magnetically coupled to the set of primary windings. The first and second sets of secondary windings are phase shifted by select amounts from the set of primary windings. The set of primary windings is connected to the input circuit. An AC/DC converter comprises first, second and third three phase rectifiers, the first three phase rectifier being powered by the first set of secondary windings, the second three phase rectifier being powered by the second set of secondary windings, and the third three phase rectifier being powered by the input circuit. An output circuit is connected between the AC/DC converter and a DC load.

The first and second sets of secondary windings may be phase shifted by equal and opposite amounts from the set of primary windings.

The first and second sets of secondary windings may be phase shifted by +20 electrical degrees and −20 electrical degrees, respectively, from the set of primary windings.

Each of the three phase rectifiers may comprise six pulse rectifiers. The input circuit may comprise a three phase inductor and an impedance matching three phase inductor electrically connected between the input circuit and the third three phase rectifier.

The output circuit may comprise parallel connected DC outputs from the bridge rectifiers connected through an output inductor to the DC load.

It is a feature of the invention that the set of primary windings comprises three main primary windings and each set of secondary windings comprises three main secondary windings. In accordance with the invention the secondary windings be polygon based to achieve symmetry and ease of manufacturability. By using opposite ends of the polygon arm of a particular phase, the desired phase shifted outputs are easily attainable. The secondary windings could also be constructed using traditional teaser windings, where the three main secondary windings are in phase with corresponding ones of the three main primary windings, and are electrically connected to three teaser secondary windings, each in phase with adjacent ones of the three main primary windings, resulting in a vector phase shifted from the phase of the corresponding one of the three main primary windings.

There is disclosed in accordance with another aspect of the invention an eighteen pulse converter system comprising an input circuit for connection to a three phase AC source. An isolation transformer comprises a set of primary windings and first and second sets of secondary windings magnetically coupled to the set of primary windings, the first and second sets of secondary windings phase shifted by select amounts from the set of primary windings, and the set of primary windings connected to the input circuit. An eighteen pulse rectifier comprises first, second and third six pulse rectifiers, the first six pulse rectifier being powered by the first set of secondary windings, the second six pulse rectifier being powered by the second set of secondary windings, and the third six pulse rectifier being powered by the input circuit. An output circuit is connected between the AC/DC converter and a DC load.

There is disclosed in accordance with a further aspect of the invention an AC/DC converter system comprising an input circuit comprising a three phase inductor for connection to a three phase AC source. An isolation transformer comprises a set of primary windings and first and second sets of secondary windings magnetically coupled to the set of primary windings, the first and second sets of secondary windings phase shifted by select amounts from the set of primary windings, the set of primary windings connected to the input circuit. An AC/DC converter comprises first, second and third three phase rectifiers each for converting AC power to DC power. The first three phase rectifier is electrically connected to the first set of secondary windings. The second three phase rectifier is electrically connected to the second set of secondary windings. An impedance matching inductor is electrically connected between the input circuit and the third three phase rectifier. An output circuit is connected between the AC/DC converter and a DC load.

Further features and advantages of the invention will be apparent from the specification and the drawings.

DETAILED DESCRIPTION OF THE INVENTION

In accordance with the invention, an isolation transformer uses two sets of secondary windings, reducing size and cost. An eighteen-pulse rectifier uses one six-pulse rectifier circuit directly connected to the AC source via some balancing inductance to match the inductance in front of the other two sets of six-pulse rectifier circuits to achieve eighteen-pulse operation.

Figure 2:
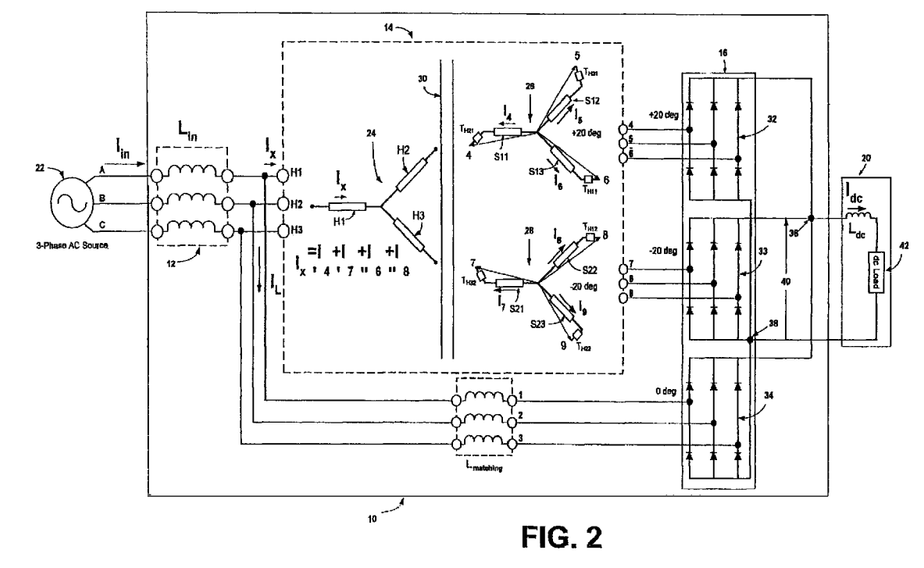
FIG. 2 is a schematic representation of an eighteen-pulse converter circuit from a phase shifted isolation transformer in accordance with the invention.

The resulting scheme has two six-pulse rectifiers powered via a phase-shifting isolation transformer, while the third six-pulse rectifier is fed directly from the AC source via a matching-impedance. Such an eighteen-pulse arrangement is shown in FIG. 2. The phase-shifting transformer feeding two of the three six-pulse rectifiers is sized to handle ⅔rd the rated power. Similarly, the matching inductor is sized to carry only ⅓rd the rated current. This arrangement results in the overall size of the transformer and matching inductor combination to be smaller and less expensive than the four winding arrangement of FIG. 1.

Particularly, an AC/DC converter system 10 comprises an input circuit 12, an isolation transformer 14, an eighteen-pulse rectifier 16, and an output circuit 20. The input circuit 12 comprises a three phase inductor $I_{IN}$ connected via terminals A, B and C to a three phase AC source 22. The isolation transformer 14 comprises a set 24 of primary windings and first and second sets 26 and 28 of secondary windings magnetically coupled via a core 30 to the set 24 of primary windings. The first and second sets 26 and 28 of secondary windings are phase shifted by select amounts from the set 24 of primary windings. The first and second sets 26 and 28 of secondary windings are phase shifted by +20 electrical degrees and −20 electrical degrees, respectively, from the set 24 of primary windings, in the illustrated embodiment of the invention. As is apparent, other phase shift amounts could be used. The set 24 of primary windings is connected to the input circuit inductor $L_{IN}$.

The eighteen-pulse rectifier 16 comprises first, second and third conventional three phase rectifiers 32, 33 and 34, each for converting AC power to DC power, as is well known. Each three phase rectifier 32-34 comprises a full bridge and is said to be a six-pulse rectifier because there are six distinct diode pair conduction intervals in one complete electrical cycle, as is conventional. The first three phase rectifier 32 is electrically connected to the first set 26 of secondary windings via nodes 4, 5 and 6. The second three phase rectifier 33 is electrically connected to the second set 28 of secondary windings via nodes 7, 8 and 9. An impedance matching inductor $L_{matching}$ is electrically connected between the input circuit inductor $L_{IN}$ and the third three phase rectifier 34 via nodes 1, 2 and 3.

The output circuit 20 connects the DC outputs of the three phase rectifiers 32-34 in parallel between nodes 36 and 38 to define a DC bus 40. An output inductor $L_{dc}$ is connected between the node 36 and a DC load 42. The AC/DC converter system 10 is particularly adapted for use with a DC load 42 in the form of a variable frequency drive. Such a drive typically includes an inverter for converting the DC power on the bus to AC power for operating the drive at a select frequency. However, the system 10 can be used with other conventional DC loads.

The phase shift in the isolation transformer 14 is achieved by winding extra teaser windings on appropriate limbs of the transformer core 30, which may be any known configuration. The primary windings are labeled H1, H2 and H3 and are electrically connected in a wye configuration. The first set 26 of secondary windings includes main windings S11, S12 and S13 in phase with the respective primary windings H1, H2 and H3 and electrically connected in a wye configuration. The second set 28 of secondary windings includes main windings S21, S22 and S23 in phase with the respective primary windings H1 H2 and H3 and electrically connected in a wye configuration. The extra teaser windings are electrically connected to the main windings of phases that are adjacent, resulting in a vector that is phase shifted with respect to the corresponding phase on the primary side. The teaser windings are marked "T" with subscript denoting the phase that they are wound on. For example, $T_{H21}$ denotes a teaser winding that is wound on the H2 winding of the primary side of the isolation transformer and is used in the first set 26 of secondary winding to yield a phase shift of +20 degrees.

In order to estimate the total current harmonic distortion in the input line current $I_{in}$, the following assumptions are made:

a. The inductance in the dc bus 40 is large enough to assume that the dc bus current has no ripple, b. The leakage inductance of the isolation transformer 14 is neglected so that the current through the windings is assumed to be rectangular in shape, c. The harmonic analysis is carried out at rated load current, $I_{dc}$, d. The windings of the isolation transformer 14 and the matching inductance $L_{matching}$ are well balanced such that the load current $I_{dc}$ is equally shared among the three different paths. In other words, the height of the rectangular current pattern in each of the parallel paths is $L_{dc}/3$, e. The primary winding marked as H1, H2, and H3, have $N_1$ turns, the long part of each secondary fork, the main winding, has $N_2$ turns and the short part of the secondary fork, the teaser winding, has $N_3$ turns. The vector combination of $N_2$ and $N_3$ should yield $N_1$ to result in a 1:1 transformation ratio.

Figure 3:
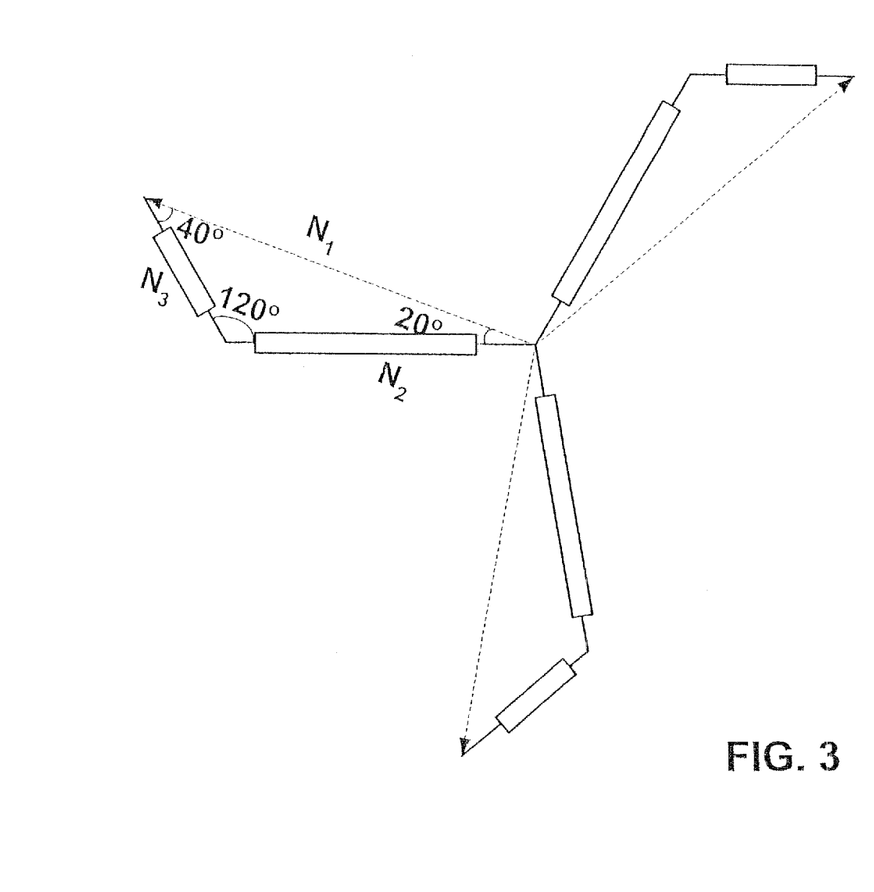
FIG. 3 is a vector representation of one of the sets of secondary windings in the isolation transformer of FIG. 2.

In order to determine the contribution of secondary currents in the primary side input current, it is important to determine the turns ratios among N1, N2, and N3. This is achieved using the expanded vector diagram shown in FIG. 3. From FIG. 3, the turns ratio in terms of $N_1$ is computed as follows:

$$\frac{N_1}{\sin(120)} = \frac{N_2}{\sin(40)} = \frac{N_3}{\sin(20)} \quad (2)$$

$$N_2 = 0.7422 N_1$$

$$N_3 = 0.3949 N_1$$

From equation (2) and FIG. 3, the components that make up the primary current $I_X$ are derived next.

$$I_X = I'_4 + I'_7 + I''_6 + I''_8 \quad (3)$$

$$I'_4 = 0.7422 \cdot \frac{I_{dc}}{3} \angle 20°$$

$$I'_7 = 0.7422 \cdot \frac{I_{dc}}{3} \angle -20°$$

$$I''_6 = 0.3949 \cdot \frac{I_{dc}}{3} \angle 140°$$

$$I''_8 = 0.3949 \cdot \frac{I_{dc}}{3} \angle -140°$$

Figure 4:
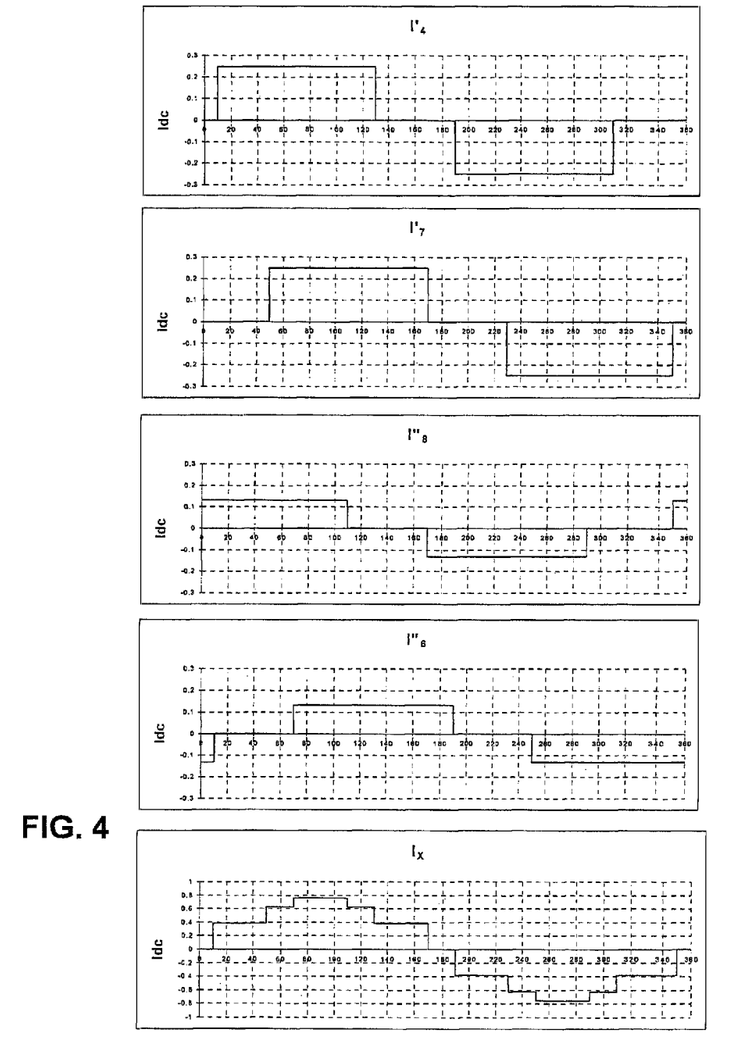
FIG. 4 is a series of curves that graphically illustrate the components that form the primary side input current, $I_x$.

The current wave shape of $I_X$ and the relative positions of the components of $I_X$, referenced in are shown in FIG. 4.

Figure 5:
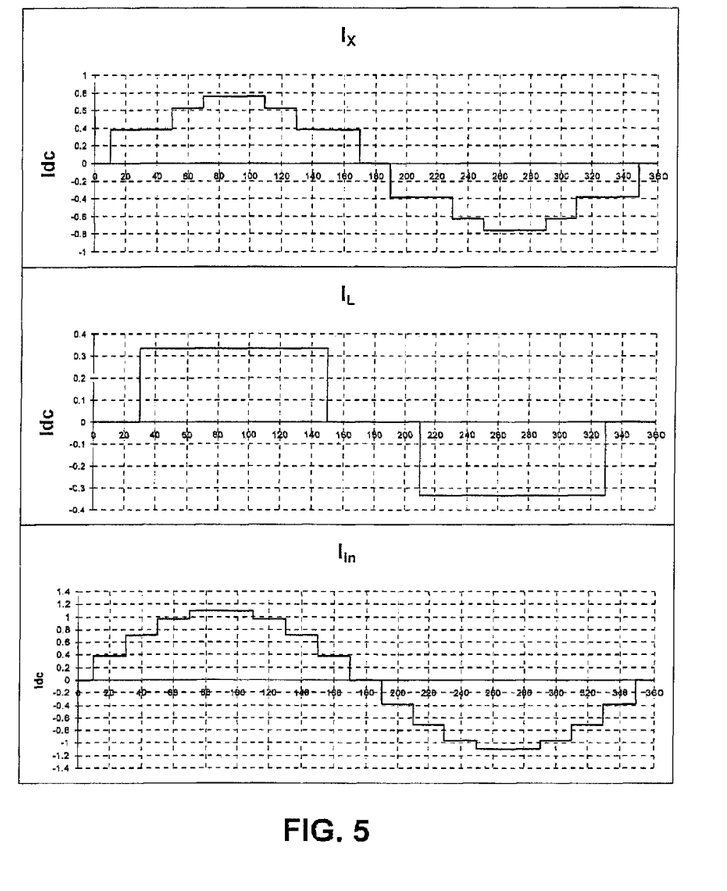
FIG. 5 is a series of curves that graphically illustrate the current $I_{in}$ being composed of $I_L$ and $I_x$.

The input current $I_{in}$ drawn from the ac source 22 is a combination of the input current $I_x$ into the transformer and the current $I_L$ flowing through the matching inductor, $L_{matching}$, directly into the third bridge rectifier 34. A graphic illustration of the formation of $I_{in}$ is shown in FIG. 5. The waveform corresponding to $I_{in}$ in FIG. 5 is used to mathematically estimate the total input current harmonic, distortion.

The staircase waveform shown in FIG. 5 for $I_{in}$ is analyzed using Fourier series. The analysis yields the theoretical value of the total input current harmonic distortion. The Fourier analysis is presented below:

$$I_{in} = I_0 + \sum_{n=1}^{n=\infty} a_n \cdot \cos(n\theta) + \sum_{n=1}^{n=\infty} b_n \cdot \sin(n\theta) \quad (4)$$

$$I_0 = \frac{1}{2 \cdot \pi} \cdot \int_0^{2\pi} I_{in} \cdot d\theta; \quad a_n = \frac{2}{\pi} \cdot \int_0^{\pi} I_{in} \cdot \cos(n\theta) \cdot d\theta;$$

$$b_n = \frac{2}{\pi} \cdot \int_0^{\pi} I_{in} \cdot \sin(n\theta) \cdot d\theta$$

component representation ($I_0$) in equation 4 is zero.

b. $I_{in}$ is symmetrical about the x-axis. This means that there are no even harmonics.

c. $I_{in}$ exhibits mirrored symmetry about $\pi$ axis. This means that $I_{in}$ is an odd function and not an even function. In other words, this property would render the coefficient $a_n$ to be zero.

d. From observations mentioned in items a through c, only the coefficient $b_n$ needs to be computed.

Based on the observations made above, the coefficient $b_n$ is computed.

$$b_n = \frac{2}{\pi} \cdot \int_0^{\pi} I_{in} \cdot \sin(n\theta) \cdot d\theta \quad (5)$$

$$= \frac{2 \cdot I_{DC}}{\pi} \cdot \left\{ \int_{\pi/18}^{\pi/6} 0.379 \cdot \sin(n\theta) \cdot d\theta + \int_{\pi/6}^{5\pi/18} 0.712 \cdot \sin(n\theta) \cdot d\theta + \right.$$

$$\int_{5\pi/18}^{7\pi/18} 0.959 \cdot \sin(n\theta) \cdot d\theta + \int_{7\pi/18}^{11\pi/18} 1.091 \cdot \sin(n\theta) \cdot d\theta +$$

$$\int_{11\pi/18}^{13\pi/18} 0.959 \cdot \sin(n\theta) \cdot d\theta + \int_{13\pi/18}^{5\pi/6} 0.712 \cdot \sin(n\theta) \cdot d\theta +$$

$$\left. \int_{5\pi/6}^{17\pi/18} 0.379 \cdot \sin(n\theta) \cdot d\theta \right\}$$

$$b_n = \frac{2 \cdot I_{DC}}{n \cdot \pi} \cdot \sin(n\pi/2) \cdot \left\{ \begin{array}{l} 0.666 \cdot \sin(n\pi/3) + 0.494 \cdot \sin(2n\pi/9) + \\ 0.758 \cdot \sin(4n\pi/9) + 0.264 \cdot \sin(n\pi/9) \end{array} \right\}$$

From equation (5), the following observations can be made:

a. The total current harmonic distortion is computed to be 8.8% for the assumed staircase waveform.

b. There does not exist any triplen harmonics.

c. The first set of lowest order harmonics encountered is the 17th and the 19th.

d. The 17th is observed to be of negative sequence, while the 19th is seen to be of positive sequence.

From the waveform for the primary side input current $I_x$ of the transformer configuration, the VA rating of the transformer is computed.

$$I_X = \sqrt{\frac{1}{\pi} \cdot \left\{ \int_0^{\pi} (i'_4 + i'_7 + i''_6 + i''_8) \cdot d\theta \right\}} \quad (6)$$

$$I_X = \sqrt{\frac{I_{DC}^2}{\pi} \cdot \left\{ \begin{array}{l} \int_{\pi/18}^{5\pi/18} 0.379^2 \cdot d\theta + \int_{5\pi/18}^{7\pi/18} 0.626^2 \cdot d\theta + \\ \int_{7\pi/18}^{11\pi/18} 0.758^2 \cdot d\theta + \int_{11\pi/18}^{13\pi/18} 0.626^2 \cdot d\theta + \\ \int_{13\pi/18}^{17\pi/18} 0.379^2 \cdot d\theta \end{array} \right\}}$$

$$I_X = \sqrt{\frac{4 \cdot I_{DC}^2}{18} \cdot \{0.626^2 + 0.758^2 + (2 \cdot 0.379^2)\}}$$

$$I_X = 0.5278 \cdot I_{DC}$$

The VA rating of the phase-shifting isolation transformer 14 is computed by multiplying the RMS value of the input current with the RMS value of the applied voltage and further multiplying the result with three to account for all the windings.

$$VA_{xfmr} = 3 \cdot V_{LN} \cdot I_X = 3 \cdot V_{LN} \cdot 0.5278 \cdot I_{DC} = 1.5834 \cdot V_{LN} \cdot I_{DC} \quad (7)$$

$$P_{out} = \frac{3 \cdot \sqrt{3} \cdot \sqrt{2} \cdot V_{LN}}{\pi} \cdot I_{DC}$$

$$\frac{VA_{xfmr}}{P_{out}} = \frac{1.5834 \cdot \pi}{3 \cdot \sqrt{6}} = 0.677$$

From equation (7), it is seen that the transformer 14 processes about ⅔rd the rated output power. This conclusion matches the physical reasoning because the power processed by the non-phase shifted section that consists of the matching inductance $L_{matching}$, is about ⅓rd the rated output power.

It is important to point out salient differences between the prior art autotransformer systems and the AC/DC converter system 10 in accordance with the invention using the isolation transformer 14. These differences include:

a. In autotransformer systems, the harmonic cancellation is primarily due to the reflected current waveform on to the branch carrying the main phase current. Due to non deal coupling and leakage effects, the cancellation is not complete and so the harmonic performance is not close to theoretical levels. In the described AC/DC converter system 10, the harmonic cancellation is not dependent on the idealness of the magnetic coupling. It is achieved by current combination at the input junction point between $I_X$ and $I_L$ FIG. 2.

b. The sudden change in current associated with autotransformers is reflected on the input lines because of the fundamental fact that the leakage inductance in autotransformers is small. The input current also shows sharp edges with quick transitions. Such abnormalities deteriorate the harmonic performance and so there is inherently a need to use significant input impedance (shown as $L_{IN}$ in FIG. 2) to smoothen the current waveform and reduce the overall input current distortion. Hence, all autotransformer configurations employ input inductance in the range of 0.05 pu to 0.08 pu. This adds cost and increases the overall size significantly. Input inductors are associated with voltage drop and need to be compensated elsewhere. In contrast, due to the different way in which harmonic cancellation is achieved in the proposed AC/DC converter system 10, the reliance on an external inductor to achieve good performance is minimal. Typical values needed for the AC/DC converter system 10 range from 0.015 pu to 0.02 pu to meet 5% THID requirements and no external inductor when 8% or higher THID is required to be met. This results in a more compact, less expensive, more efficient system.

c. Autotransformer systems rely heavily on stub windings. Stub windings are difficult to be practically implemented resulting in wastage of copper and poor utilization of the core. Manufacturing time is also longer due to the many complicated interconnections that need to be performed. In contrast, the AC/DC converter system 10 relies on standard isolation transformer techniques and is easy to manufacture with very few windings. Core and copper utilization is better, resulting in a more efficient and less expensive product.

d. Autotransformer topologies that convert a 3-phase system to a 9-phase output create an aberration in the dc bus ripple content of a VFD. When one or two of nine output phases has a bad diode, the increase in dc bus ripple is hardly noticeable and this reduces the chance for detection of failure. The power flow is now shared by the remaining diodes that can eventually fail. In contrast, in the AC/DC converter system 10, the dc bus ripple still corresponds to a typical 3-phase, 18-pulse system and a failure in any one of the rectifier diodes is easily detected thereby enabling the protection circuit and shutting off the VFD. This results in a much safer operation.

e. An important deficiency observed in all 3-phase to 9-phase auto transformer schemes is the sudden change in current from one conducting pair to the other every 40 electrical degrees. The situation is amplified since most autotransformers do not have enough leakage inductance to slow the transition resulting in high di/dt across the rectifier diodes. This situation has studied by the present inventors and statistical records have shown that standard rectifier grade diodes are vulnerable to premature failure. In contrast, the AC/DC converter system 10, the transition is observed to be much slower and corresponds to a typical rectifier with much lower values of di/dt. This results in less stress to the rectifier diodes and improves the mean time between failures (MTBF).

Thus the AC/DC converter system 10 in accordance with the invention uses a topology that is easy to manufacture, less complicated, and provides superior performance. It has good copper and core utilization and hence is less expensive. This topology results in a current THD of less than 5% when used in conjunction with a 0.02 pu value of input inductance. The input inductance is optional and THID distortion level of less than 7% is observed when no input-inductance is used.

In the hybrid 18-pulse topology discussed above, a matching inductor $L_{matching}$ is used in parallel with a three winding isolation transformer 14. The two sets of secondary windings 26 and 28 are phase shifted with respect to the primary winding 24 by +20 degrees and −20 degrees, respectively. By allowing flow of current through the matching inductor $L_{matching}$, without any phase shift, results in three distinct current vectors that are at 0-degrees, +20-degrees, and −20-degrees with respect to the input AC supply. For good harmonic cancellation, the RMS value of the current in the three sets should be as closely matched as possible. This improves harmonic cancellation.

The three phase inductor $L_{matching}$ is matched to the windings of the isolation transformer 14 to balance current flowing, into the first, second and third three phase six-pulse rectifiers 32-34. The RMS value of the currents flowing into the three six-pulse rectifiers 32-34 are the same, resulting from the fact that the wave shape and duration of conduction of corresponding diode pairs in each of the three six-pulse rectifiers are the same.

There are two aspects of the current waveform, both of which need to be matched to achieve optimal harmonic performance. They are the shape of the current waveform, and the RMS value of current. The shape of the current waveform flowing through the secondary windings and of the isolation transformer is matched to that flowing though the non-phase shifted route by manipulating the inductance of the inductor chosen in this path. The inductor thus facilitates only one aspect of the matching that is required for optimal harmonic performance. The second aspect of the matching deals with the RMS value of the current flowing through the phase shifted secondary windings and through the non phase shifted route. In order to achieve optimal harmonic performance, the RMS value balance is desired to be achieved at the rated operating condition since at this condition, harmonic content in the input current is the highest. To achieve this, in accordance with another aspect of the invention, either the primary or both the secondary windings of the isolation transformer are provided with voltage taps. Once a particular tap position is chose it is typically fixed and the resulting secondary voltage is higher than the primary voltage, irrespective of the operating load condition. As the load on the rectifier increases, the voltage drop across the isolation transformer increases and the voltage tap then compensates for this voltage drop. By appropriately sole the tap value, the voltage drop across the transformer can be effectively compensated. The tap value depends on the voltage drop across the transformer, which in turn depends on the leakage impedance of the transformer. By knowing the latter, correct tap positions can be predetermined during the construction phase of the isolation transformer.

In summary, shape matching is provided by the inductance of the inductor in the non phase shifted path, while the amplitude matching is provided by the taps in the isolation transformer. The taps can either be placed on the primary side, which is a less expensive option, or can be placed in each of the isolated secondary windings. Providing taps on the secondary windings can assist in controlling the individual secondary voltages independently, which in some cases may provide more flexibility and better control of the RMS value of current through those windings.

In one aspect of the invention, the taps are positioned so that voltage level is translated to a higher voltage by equal amounts. In accordance with an illustrated embodiment of the invention the amount is in a range of between about 2.5% and 5%. Particularly, taps can be from −5% to +5% in increments of 2.5%. As is apparent, different levels could also be used.

Shape matching by the use of inductor in the non-phase shifted path is discussed next.

The current flowing through the isolation transformer feeding an AC to DC rectifier with a large DC link capacitor is wave shaped by the leakage inductance of the transformer. Unfortunately, the leakage inductance off the transformer is a function of the current flowing through the transformer and hence is not of a fixed value. Most transformer manufacturer's refer to a term called Impedance or "Z" of the transformer and provide the end user an estimated (not measured, but calculated) value of the leakage impedance that the transformer will offer under rated current condition at a specified operating temperature. In order to assure that the current flowing through one of the secondary windings of the isolation transformer matches in shape and duration to the current flowing through the matching inductor $L_{matching}$, see FIG. 6, the impedance offered by the matching inductor should match the impedance offered to current through one of the secondary windings. This task is not easy because the matching inductor has fixed inductance value, while the leakage inductance offered by the transformer for the current flowing through one of its secondary windings is load dependent. Hence, it is important to determine the operating point where best matching is desired to achieve optimal performance. Generally, this point is at the rated operating condition.

Amplitude matching among the phase shifted and non-phase shifted current paths is addressed next.

Figure 6:
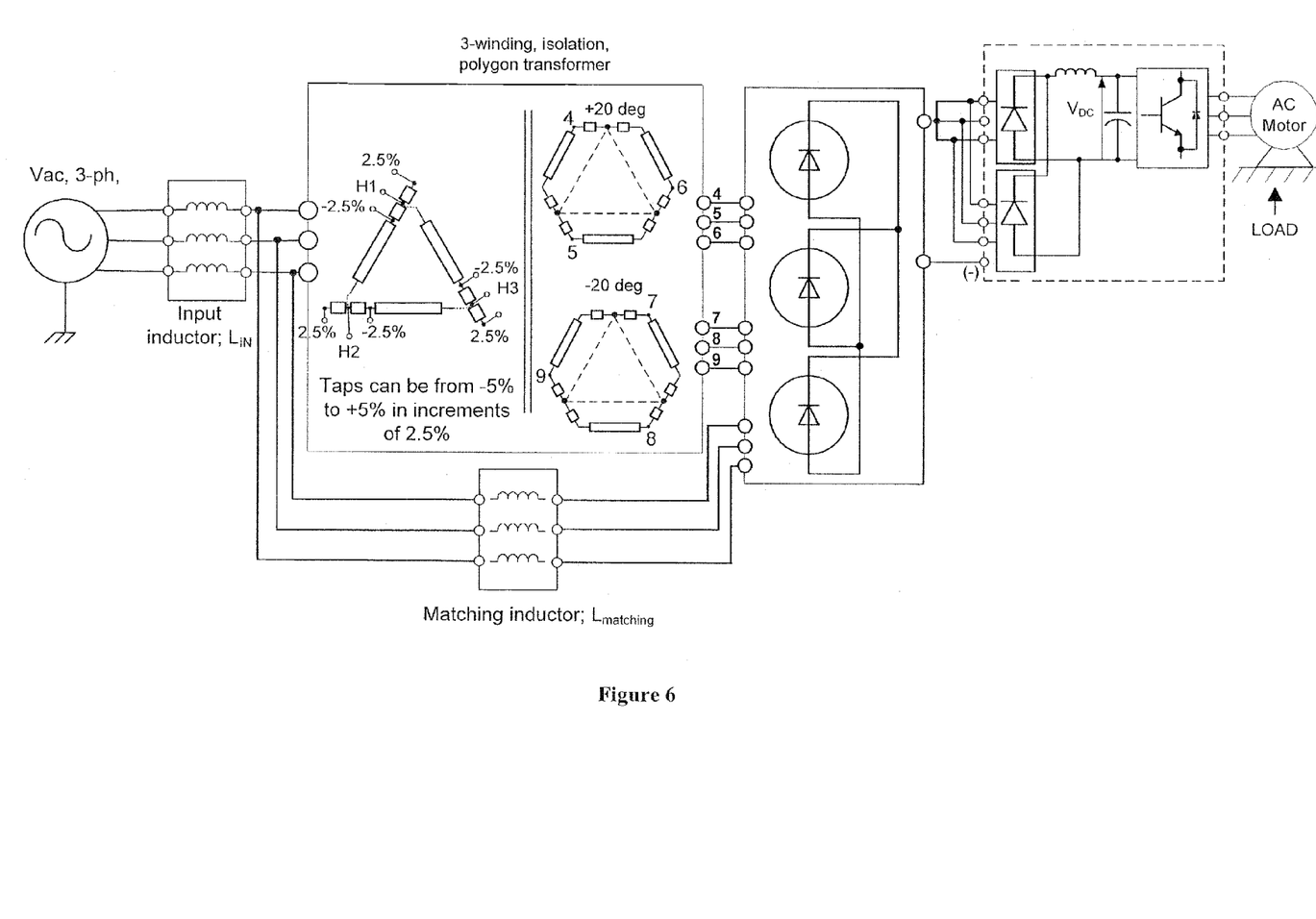
FIG. 6 is a schematic of a hybrid 18-pulse system with a balancing inductor and single set of taps in the primary winding.

As mentioned earlier, when current flows through the phase shifting isolation transformer shown in FIG. 6, there is a voltage drop, which is load dependent. The RMS value of the current through the secondary windings should closely match the RIMS value of the current through the matching inductor, $L_{matching}$ in FIG. 6. The point at which this matching is desired is typically chosen to be the rated operating point. By introducing taps in the primary winding of the isolation transformer, as shown in FIG. 6, it is possible to increase the secondary voltage, which in turn can compensate for the voltage drop caused by current flowing through the transformer at rated load condition. If the windings in the secondary are well balanced between themselves, only one set of primary taps is sufficient to compensate for the voltage drop caused by the transformer. However, if there is a possibility that the secondary windings are not closely balanced, it is prudent to use independent set of taps in the secondary windings as shown in FIG. 7.

Figure 7:
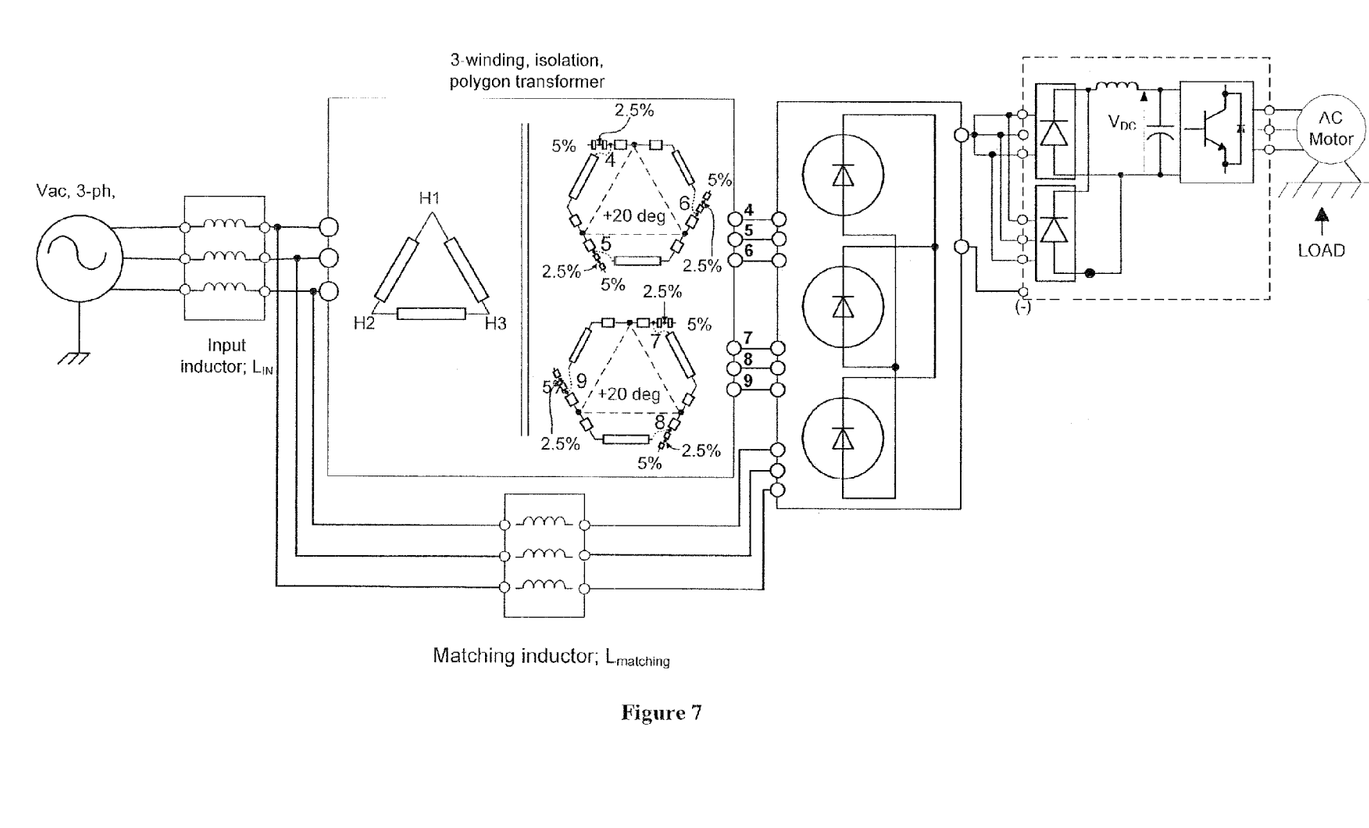
FIG. 7 is a schematic of a hybrid 18-pulse system with a balancing inductor and independent taps in secondary windings.

FIG. 6 and FIG. 7 show the use of a polygon type of isolation transformer. The structure shown has better copper and core utilization factor and results in a compact size and lower cost transformer for a given VA rating. The desired power rating of the isolation transformer in the proposed topology is only 67% of the full power rating of the AC to DC rectifier system.

In yet another embodiment of the invention, the primary set of taps can also be used in a manner to afford more flexibility. By setting the primary connection points, H1~H3 to be at −2.5%, the secondary voltages will be boosted up to compensate for the drop in the voltage across the transformer as discussed per FIG. 6. Instead of supplying the balancing inductors from the connection points H1~H3 as shown in FIG. 6, they could be supplied from the +2.5% tap to boost up the non phase shifted part as well if it is desired. In some cases, such an arrangement has led to a better optimization. The scheme just described is shown in FIG. 8.

FIG. 6 illustrates an AC/DC converter system comprising an input circuit comprising a three phase inductor for connection to a three phase AC source. An isolation transformer comprises a set of primary windings and first and second sets of secondary windings magnetically coupled to the set of primary windings. The first and second sets of secondary windings are level translated to a higher voltage by an amount in a range of between about 2.5% and 5% from the set of primary windings by providing taps located in a range of between about −2.5% and −5% in the primary winding. The set of primary windings is connected to the input circuit. An AC/DC converter comprises first, second and third three phase rectifiers each for converting AC power to DC power. The first three phase rectifier is electrically connected to the first set of secondary windings. The second three phase rectifier is electrically connected to the second set of secondary windings. An inductor is electrically connected between the input circuit and the third three phase rectifier, comprising a current balancing three phase inductor matched to the windings of the isolation transformer to balance current flowing into the first, second and third three phase rectifiers. An output circuit is provided for connection between the AC/DC converter and a DC load.

FIG. 7 illustrates an AC/DC converter system comprising an isolation transformer comprising a set of primary windings and first and second sets of secondary windings magnetically coupled to the set of primary windings. The first and second sets of secondary windings are level translated to a higher voltage by an amount in the range of about 2.5% and 5% from the set of primary windings using independent taps in the secondary windings.

Figure 8:
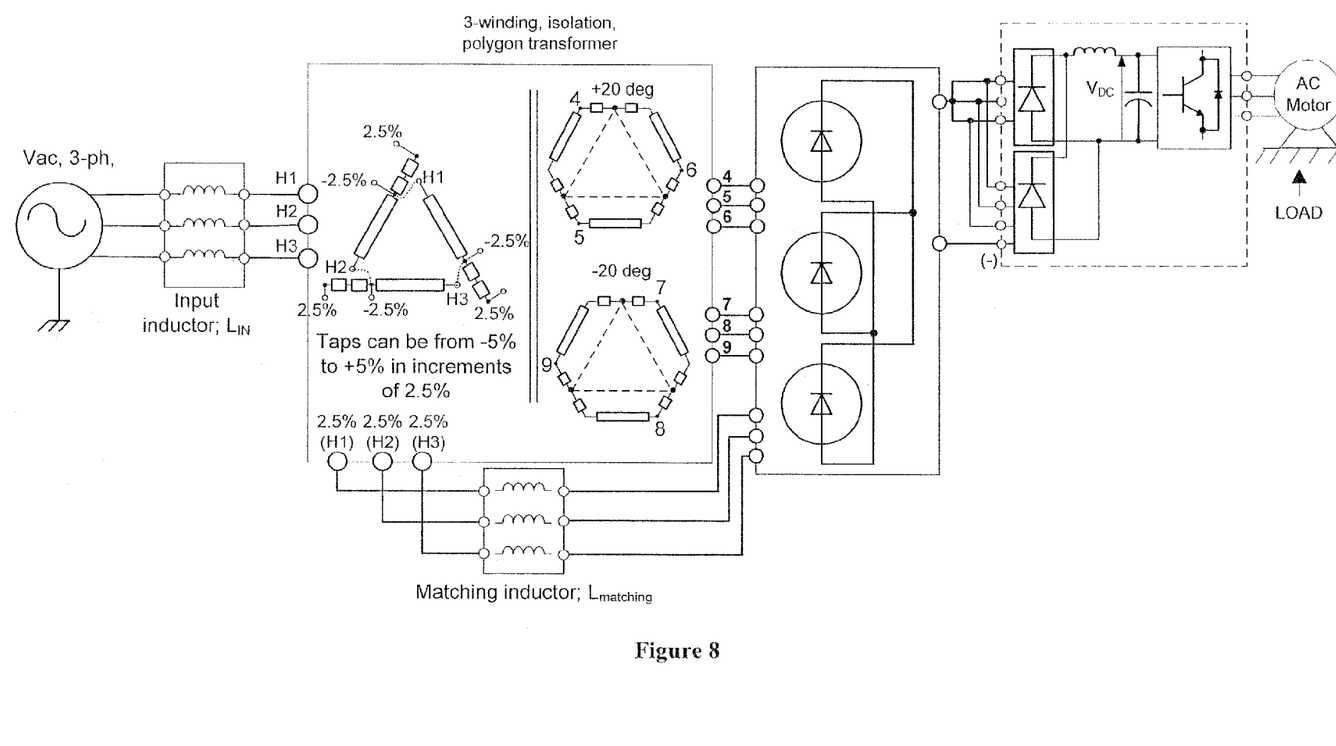
FIG. 8 is a schematic of a hybrid 18-pulse system supplying the balancing inductor from +2.5% taps on the primary side to obtain better matching.

FIG. 8 illustrates that the inductor is electrically connected between a primary winding tab in a range between about +2.5% or +5% and the third three phase rectifier.

I claim:

1. An AC/DC converter system comprising:
an input circuit for connection to a three phase AC source;
an isolation transformer comprising a set of primary windings and first and second sets of secondary windings magnetically coupled to the set of primary windings, the first and second sets of secondary windings phase shifted by select amounts from the set of primary windings, the set of primary windings connected to the input circuit;

an AC/DC converter comprising first, second and third three phase, six-pulse rectifiers, the first three phase six-pulse rectifier being powered by the first set of secondary windings, the second three phase six-pulse rectifier being powered by the second set of secondary windings, and the third three phase six-pulse rectifier being powered by the input circuit;

a current balancing three phase inductor electrically connected between the input circuit and the third three phase six-pulse rectifier, the three phase inductor being matched to the windings of the isolation transformer to balance current flowing into the first, second and third three phase six-pulse rectifiers such that the rms value of the currents flowing into the three six-pulse rectifiers are the same, resulting from the wave-shape and duration of conduction of corresponding diode pairs in each of the three six-pulse rectifiers being the same; and an output circuit for connection between the AC/DC converter and a DC load.

2. The AC/DC converter system of claim 1 wherein the first and second sets of secondary windings are level translated to a higher voltage by equal amounts of between about 2.5% and 5% from the set of primary windings by providing taps in the primary windings.

3. The AC/DC converter system of claim 1 wherein the first and second sets of secondary windings are level translated to a higher voltage by equal amounts of between about 2.5% and 5% from the set of primary windings by providing taps in the secondary windings.

4. The AC/DC converter system of claim 1 wherein the first and second sets of secondary windings are phase shifted by +20 electrical degrees and −20 electrical degrees, respectively, from the set of primary windings.

5. The AC/DC converter system of claim 1 wherein the input circuit comprises a three phase inductor.

6. The AC/DC converter system of claim 1 wherein the output circuit comprises parallel connected DC outputs from the bridge rectifiers connected through an output inductor to the DC load.

7. The AC/DC converter system of claim 1 wherein the set of primary windings comprises three main primary windings and each set of secondary windings comprises three main secondary windings, each in phase with corresponding ones of the three main primary windings, electrically connected to three teaser secondary windings, each in phase with adjacent ones of the three main primary windings, resulting in a vector phase shifted from the phase of the corresponding one of the three main primary windings.

8. An AC/DC converter system comprising:
an input circuit comprising a three phase inductor for connection to a three phase AC source;
an isolation transformer comprising a set of primary windings and first and second sets of secondary windings magnetically coupled to the set of primary windings, the first and second sets of secondary windings level translated to a higher voltage by an amount in the range of about 2.5% and 5% a from the set of primary windings using independent taps in the secondary windings, the set of primary windings connected to the input circuit;
an AC/DC converter comprising first, second and third three phase rectifiers each for converting AC power to DC power, each of the rectifiers comprising a six-pulse rectifier;
the first three phase rectifier being electrically connected to the first set of secondary windings;
the second three phase rectifier being electrically connected to the second set of secondary windings;
an inductor electrically connected between the input circuit and the third three phase rectifier, comprising a current balancing three phase inductor matched to the windings of the isolation transformer to balance current flowing into the first, second and third three phase rectifiers; and
an output circuit for connection between the AC/DC converter and a DC load.

9. The AC/DC converter system of claim 8 wherein the first and second sets of secondary windings are phase shifted by +20 electrical degrees and −20 electrical degrees, respectively, from the set of primary windings.

10. The AC/DC converter system of claim 8 wherein the output circuit comprises parallel connected DC outputs from the bridge rectifiers connected through an output inductor to the DC load.

11. The AC/DC converter system of claim 8 wherein the set of primary windings comprises three main primary windings and each set of secondary windings comprises three main secondary windings, each in phase with corresponding ones of the three main primary windings, electrically connected to three teaser secondary windings, each in phase with adjacent ones of the three main primary windings, resulting in a vector phase shifted from the phase of the corresponding one of the three main primary windings.

12. An AC/DC converter system comprising:
an input circuit comprising a three phase inductor for connection to a three phase AC source;
an isolation transformer comprising a set of primary windings and first and second sets of secondary windings magnetically coupled to the set of primary windings, the first and second sets of secondary windings level translated to a higher voltage by an amount in a range of between about 2.5% and 5% from the set of primary windings by providing taps located in a range of between about −2.5% and −5% in the primary winding, the set of primary windings connected to the input circuit;
an AC/DC converter comprising first, second and third three phase rectifiers each for converting AC power to DC power, each of the rectifiers comprising a six-pulse rectifier;
the first three phase rectifier being electrically connected to the first set of secondary windings;
the second three phase rectifier being electrically connected to the second set of secondary windings;
an inductor electrically connected between a primary winding tab in a range between about +2.5% or +5% and the third three phase rectifier, comprising a current balancing three phase inductor matched to the windings of the isolation transformer to balance amplitude of current flowing into the first, second and third three phase rectifiers; and
an output circuit for connection between the AC/DC converter and a DC load.

13. The AC/DC converter system of claim 12 wherein the first and second sets of secondary windings are phase shifted by +20 electrical degrees and −20 electrical degrees, respectively, from the set of primary windings.

14. The AC/DC converter system of claim 12 wherein the output circuit comprises parallel connected DC outputs from the bridge rectifiers connected through an output inductor to the DC load.

15. The AC/DC converter system of claim 12 wherein the set of primary windings comprises three main primary windings and each set of secondary windings comprises three main secondary windings, each in phase with corresponding ones of the three main primary windings, electrically connected to three teaser secondary windings, each in phase with adjacent ones of the three main primary windings, resulting in a vector phase shifted from the phase of the corresponding one of the three main primary windings.

* * * * *